Oct. 31, 1939.   H. F. BROWN   2,177,820
BORING CHUCK
Filed June 23, 1937
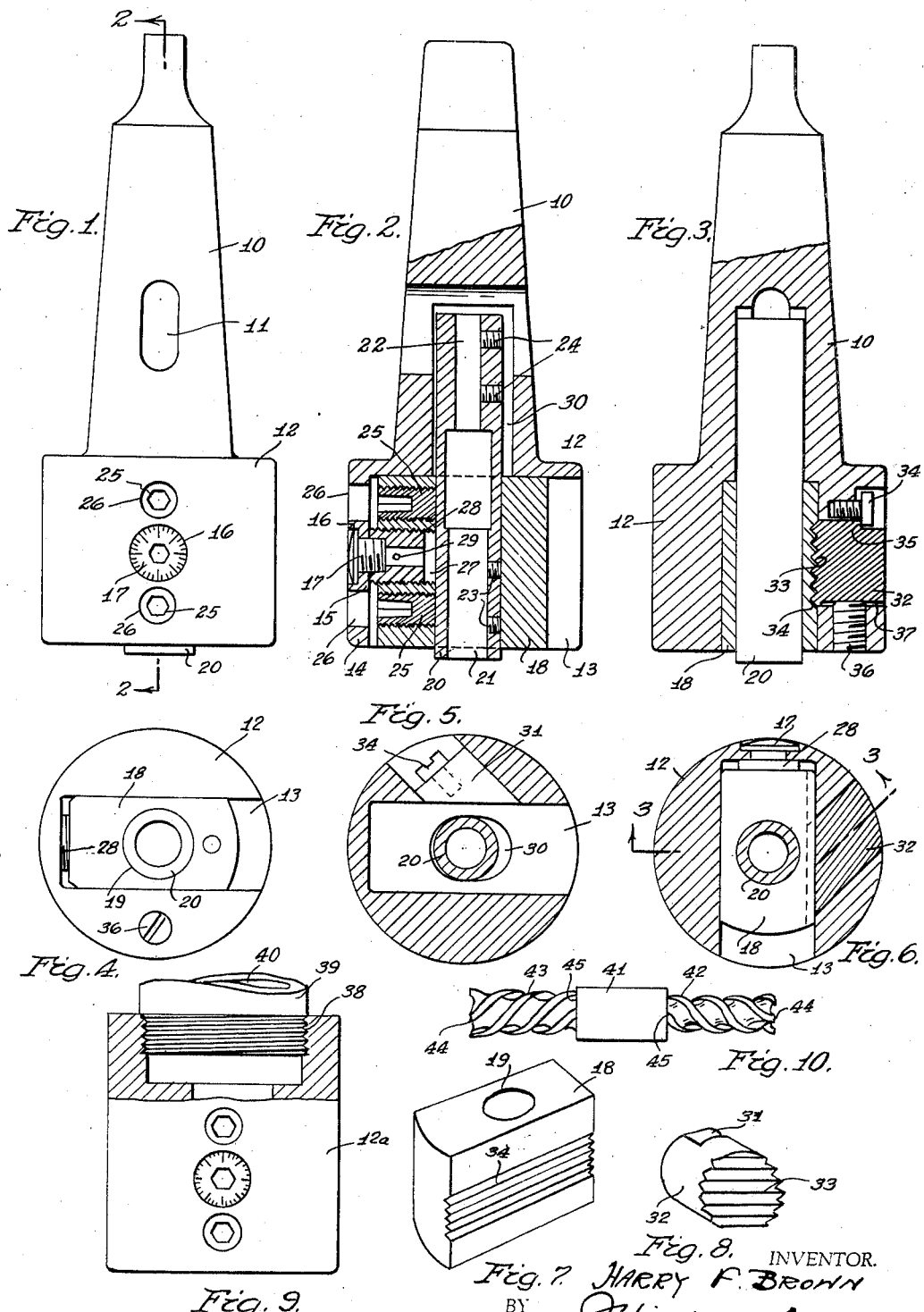
INVENTOR.
HARRY F. BROWN
BY
ATTORNEY.

Patented Oct. 31, 1939

2,177,820

UNITED STATES PATENT OFFICE 2,177,820

BORING CHUCK

Harry F. Brown, Detroit, Mich.

Application June 23, 1937, Serial No. 149,863

2 Claims. (Cl. 279—6)

This invention relates to chucks for the holding of boring and similar tools, having for its object to provide a chuck which lends itself to the utilizing of tool bits, especially of small and economical size and form, as well as the adaptation of tools, such as end mills to boring and similar operations.

Further objects are to provide a chuck offering adequate tool anchorage in excess of that usually provided, and to provide adjustments and locking means for the adjustable elements of the chuck which will assure precision and accuracy of machining, as well as accurate determination of the location and setting of the tool bit relative to the work.

Another object is to provide a chuck suitable for attachment to presently used machines having a hollow chuck holder such that double ended end mills may be employed therewith.

A further object of the invention is to provide an improved tool capable of use as a boring tool and as an end mill, which will have prolonged life and which can be made double-ended.

Still further objects in addition or subsidiary to the aforesaid objects, or resulting from the construction or operation of the invention as it may be carried into effect, will become apparent as the said invention is hereinafter further disclosed.

In carrying the said invention into effect, I may adopt the novel construction and arrangement of parts hereinafter described, by way of example, having reference to the accompanying drawing, wherein:

Figure 1 is a side elevation of my improved chuck;

Figure 2 is a longitudinal section of the same taken on the line 2—2, Figure 1;

Figure 3 is a similar view with the section taken on the line 3—3, Figure 6;

Figure 4 is an end view of the chuck;

Figure 5 is a detail cross section taken on the line 5—5, Figure 2;

Figure 6 is a detail cross section taken on the line 6—6, Figure 3;

Figure 7 is a detail perspective view of the adjustable block removed;

Figure 8 is a detail perspective view of the wedge removed;

Figure 9 shows a modified form of my chuck for application to a different type of machine from that of Figures 1, 2 and 3, and Figure 10 is an elevation of a double ended end mill of improved design.

Similar characters of reference indicate similar parts in the several figures of the drawing.

The body of the chuck is shown as comprising a hollow taper shank 10 provided with a transverse slot 11 and terminating in a head 12 which has a deep laterally elongated recess 13 extending almost entirely across the said head and bounded at one end by the wall 14 forming part of the head. This wall is drilled at 15 and counterbored at 16 to freely accommodate the stem and head, respectively, of a stud 17 the purpose of which will be further explained.

The recess 13 accommodates a block 18 slidable laterally of the head therein, this block being drilled at 19 to receive a tool holder or collet 20 in the form of a sleeve having bores 21 and 22 which may be of different sizes to accommodate end mills of different sizes. Thus one tool may have an end which constitutes an end mill of say, $\frac{7}{16}$ inch, and another end which constitutes an end mill of say, ½ inch. Only half the usual number of tools will thus be required, thus effecting a substantial saving. The end mills may be secured in the head by set screws (not shown) for which tapped holes 23 and 24 are provided. The collet 20 is reversible in the chuck to bring either of the end mills which it may carry into position for use. Set screws 25 mounted in the said block for securing the collet in longitudinal positions of adjustment in the said block are accessible through openings 26 provided in the wall 14 of the head 12.

Between the said set screws 25 is a threaded opening 27 receiving a cross feed adjusting screw 28 to which the stem of the stud 17 is fixed as by the pin 29, so that rotation of the said stud, which shoulders against the inner side of the wall 14, will cause adjustment of the said block laterally of the head in the said recess 13.

The shank of the chuck has a bore 30 to receive the inner end of the collect 20, and laterally enlarged in the direction of movement of the block 18, whereby the lateral adjustment of the said collet with the block is permitted, when the feed screw 28 is operated by rotation of the stud 17 for that purpose.

The body 12 of the chuck is also provided with an inclined orifice 31 in which slides a wedge or clamping member 32 the inner face of which may be serrated as at 33 to engage corresponding serrations 34 on one side of the block 18 whereby to increase the area of surface friction contact, and also to operate as means holding the said block against falling outwardly of the head, the said serrations being at right angles to the axis of the head.

34 is a set screw the head of which is positioned to bear against a shoulder 35 provided on the said wedge. This set screw is effective in applying pressure to the said wedge 32 to increase its frictional engagement with the block 18 after adjustment of the said block has been effected by operation of the said feed screw 28 as described. 36 is another set screw in the head adapted to bear against a flat on said wedge to lock the wedge in its block-securing position and to relieve the head of the set screw 34 from excessive pressure after the wedge has been adjusted to its locking position.

It will be seen that the tool collet may be adjusted longitudinally or laterally in the chuck as well as reversed end for end as may be desired and these adjustments, together or separately, may be followed by adequate locking and support of the elements of the device against further displacement when the tool is in use. The head of the adjusting stud 17 may be graduated as shown for precision determination of the lateral adjustment of the tool being used, the chuck thereby lending itself admirably to delicate and accurate work.

The chuck described is not, of course, strictly limited to boring tools, or boring operations, as other tools such, for instance, as boring bars, boring bars with tool bits and so forth may be used in the device, and the adaptations of such tools to special operations and work by reason of their adjustment in the chuck will suggest themselves in considerable variety to the machinist.

The device also permits the use of comparatively short end mills, as will be apparent, with consequent saving in tool costs.

Further the tool may be deeply inserted into the collet, or even passed completely therethrough, and as the said collet may at all times, notwithstanding its adjustment, contact on diametrically opposite sides with the walls of the bore 30 of the shank, a very rigid anchorage of the tool bit may be obtained conducive to freedom from chatter or "give" in the said bit.

Figure 9 illustrates my improved chuck 12a adapted for use with a machine of the type having the shank 10 previously described constituting an integral part of the machine proper rather than as a part of the chuck. In this case the rear end of the chuck has a large internally threaded opening 38 to engage the exterior threaded portion of the chuck holder 39. The chuck holder in the type of machine to which I refer is hollow as indicated at 40 and hence may be employed in the same manner, as previously described, as the well 30 in the shank 10. The chuck proper 12a is otherwise constructed as described in connection with Figures 1 to 8 inclusive and for the same purposes.

Figure 10 shows the type of end mill which I prefer and which is an improvement over tools for similar purposes. This end mill has a central body portion 41 which is adapted for engagement by the chuck, as previously described, and two end portions 42 and 43 having mills of different size. Either end of this tool may be used in off center position in a hole as a boring tool and then centered up and used as an end mill. Due to the fact that that portion of end mills near the leading edge receives the greater wear and are thereafter ground, they become tapered. Such wear is due in large part to the fact that the tool springs backwardly when contacting work only from one side and I therefore provide an original reverse taper, the diameter of the outer end 44 being greater than the inner ends 45, respectively. Thus when the tool springs or bends away from the point of contact the tendency will be to straighten the side rather than to form a bend in it. This tool has a cutting edge at its ends 44 as well as along the side walls, thus accommodating it to its double use.

This invention may be developed within the scope of the following claims without departing from the essential features of the said invention and it is desired that the specification and drawing be read as being merely illustrative and not in a limiting sense, except as necessitated by the prior art.

What I claim is:

1. In a tool chuck, a head provided with a laterally extending opening, a tool-receiving block adjustable laterally of the head in said opening, a tightening member engaging said block, said member having a grooved engagement with said block holding said block against longitudinal movement in said slot when said tightening member is loosened, means for applying positive pressure to said member against said block, and means for holding said member in a position maintaining said pressure.

2. In a tool chuck, a head, a block laterally adjustable therein, a wedge in said head for securing said block in adjusted positions, said wedge having a grooved engagement with said block holding said block against longitudinal movement relative to the chuck, means carried by said head for positively pressing said wedge into frictional engagement with said block, and means for holding said wedge in a position maintaining said frictional engagement.

HARRY F. BROWN.